(12) United States Patent
Koeten et al.

(10) Patent No.: US 10,073,864 B1
(45) Date of Patent: *Sep. 11, 2018

(54) SYSTEMS AND METHODS FOR AUTOMATED AGGREGATION OF INFORMATION-SOURCE METADATA

(71) Applicant: Veritas Technologies LLC, Mountain View, CA (US)

(72) Inventors: Robert Koeten, Menlo Park, CA (US); Stuart Carter, Rüdlingen (CH)

(73) Assignee: Veritas Technologies LLC, Mountain City, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/561,244

(22) Filed: Dec. 5, 2014

Related U.S. Application Data

(60) Provisional application No. 61/988,213, filed on May 4, 2014.

(51) Int. Cl.
    *G06F 17/30* (2006.01)

(52) U.S. Cl.
    CPC .. *G06F 17/30289* (2013.01); *G06F 17/30501* (2013.01); *G06F 17/30525* (2013.01)

(58) Field of Classification Search
    CPC ................................................. G06F 17/30289
    See application file for complete search history.

(56) References Cited

U.S. PATENT DOCUMENTS

| | | | |
|---|---|---|---|
| 6,446,061 B1 | 9/2002 | Doerre et al. | |
| 6,658,413 B1 | 12/2003 | Reddy et al. | |
| 7,516,412 B1 * | 4/2009 | de Waal | G06F 9/4443 |
| | | | 715/243 |

(Continued)

FOREIGN PATENT DOCUMENTS

WO      WO 2015/055502 A2     4/2015

OTHER PUBLICATIONS

Tim Haynes; Systems and Methods for Navigating Through a Hierarchy of Nodes Stored in a Database; U.S. Appl. No. 14/480,558, filed Sep. 8, 2014.

(Continued)

*Primary Examiner* — Jorge A Casanova
(74) *Attorney, Agent, or Firm* — FisherBroyles LLP

(57) ABSTRACT

The disclosed computer-implemented method for automated aggregation of information-source metadata may include (1) receiving metadata of an information asset, the metadata of the information asset having been generated by a data-management system, (2) determining that the metadata of the information asset includes metadata of an information source that contains the information asset, (3) extracting the metadata of the information source from the metadata of the information asset, (4) storing the metadata of the information source in an information-source metadata repository such that the metadata of the information source is associated with the information source, and (5) providing access to the metadata of the information source stored in the information-source metadata repository to (a) the data-management system, (b) an additional data-management system, and/or (c) the entity. Various other methods, systems, and computer-readable media are also disclosed.

20 Claims, 7 Drawing Sheets

(56) References Cited

U.S. PATENT DOCUMENTS

| | | | |
|---|---|---|---|
| 8,458,186 | B2 | 6/2013 | Stringham et al. |
| 8,682,886 | B2 | 3/2014 | Sorkin et al. |
| 8,737,683 | B2 | 5/2014 | Kirmse et al. |
| 2001/0037324 | A1 | 11/2001 | Agrawal et al. |
| 2001/0039544 | A1 | 11/2001 | Chakrabarti et al. |
| 2002/0010708 | A1 | 1/2002 | McIntosh |
| 2002/0055942 | A1* | 5/2002 | Reynolds ............... G06F 21/64 |
| 2003/0145277 | A1 | 7/2003 | Neal et al. |
| 2007/0244892 | A1 | 10/2007 | Narancic |
| 2008/0071908 | A1 | 3/2008 | Nair et al. |
| 2008/0235077 | A1* | 9/2008 | Harkness ........... G06Q 30/0201 |
| | | | 705/7.29 |
| 2009/0049040 | A1 | 2/2009 | Fay et al. |
| 2009/0125828 | A1 | 5/2009 | Fried et al. |
| 2010/0088317 | A1* | 4/2010 | Bone ................ G06F 17/30144 |
| | | | 707/737 |
| 2010/0146004 | A1 | 6/2010 | Sim-Tang et al. |
| 2010/0274750 | A1 | 10/2010 | Oltean et al. |
| 2011/0113466 | A1 | 5/2011 | Stringham et al. |
| 2013/0054731 | A1 | 2/2013 | Branton |
| 2013/0204886 | A1 | 8/2013 | Faith et al. |
| 2014/0006244 | A1 | 1/2014 | Crowley et al. |
| 2014/0052689 | A1 | 2/2014 | Ficara et al. |
| 2014/0068706 | A1 | 3/2014 | Aissi |
| 2014/0081890 | A1 | 3/2014 | Casiano |
| 2014/0098101 | A1 | 4/2014 | Friedlander et al. |
| 2014/0294169 | A1 | 10/2014 | Barinov |
| 2015/0088812 | A1 | 3/2015 | Ziauddin et al. |
| 2015/0095430 | A1* | 4/2015 | Kaushik ................. H04L 51/08 |
| | | | 709/206 |
| 2015/0347773 | A1 | 12/2015 | Bonney et al. |
| 2016/0306897 | A1 | 10/2016 | Huang et al. |

OTHER PUBLICATIONS

Tim Haynes, et al; Systems and Methods for Organizing Multi-Faceted Sets of Data; U.S. Appl. No. 14/480,560, filed Sep. 8, 2014.
"SQL", http://en.wikipedia.org/wiki/SQL, as accessed May 1, 2014, Wikipedia, (Jan. 1, 2004).
"Relational database management system", http://en.wikipedia.org/wiki/Relational_database_management_system, as accessed May 1, 2014, Wikipedia, (Dec. 18, 2003).
"The four categories of NoSQL databases", http://rebelic.nl/2011/05/28/the-four-categories-of-nosql-databases/, as accessed May 1, 2014, (Aug. 2, 2013).
Alok Dwivedi, et al; Systems and Methods for Automatically Translating Data Records; U.S. Appl. No. 14/540,171, filed Nov. 13, 2014.
Robert Koeten; Systems and Methods for Aggregating Information-Asset Classifications; U.S. Appl. No. 14/542,165, filed Nov. 14, 2014.
"BigQuery in Practice: Loading Data Sets That are Terabytes and Beyond", https://cloud.google.com/developers/articles/bigquery-in-practice/, as accessed May 1, 2014, (Feb. 27, 2014).
Stockinger, Kurt et al., "Query-Driven Visualization of Large Data Sets", http://www.researchgate.net/publication/200084949_Query-Driven_Visualization_of_Large_Data_Sets, as accessed May 1, 2014, Visualization, 2005, VIS 05, IEEE, (2005).
"Apache Spark—a Fast Big Data Analytics Engine", https://bighadoop.wordpress.com/2014/04/03/apache-spark-a-fast-big-data-analytics-engine/, as accessed May 1, 2014, (Apr. 3, 2014).
"Improving Database Query Performance", http://kb.tableausoftware.com/articles/knowledgebase/database-query-performance, as accessed May 1, 2014, (Dec. 19, 2011).
"Collaborative filtering", http://en.wikipedia.org/wiki/Collaborative_filtering, as accessed May 1, 2014, Wikipedia, (Apr. 27, 2004).
Keyser, Chris "Optimizing for Star Schemas on Amazon Redshift", http://aws.amazon.com/articles/8341516668711341, as accessed May 1, 2014, Amazon Web Services, Inc., (Dec. 31, 2013).
Ynn-Pyng Anker Tsaur; Systems and Methods for Securely Storing Backup Data While Facilitating Fast Failovers; U.S. Appl. No. 13/656,536, filed Oct. 19, 2012.
Carey Nachenberg; Systems and Methods for Detecting Malicious Files; U.S. Appl. No. 13/715,265, filed Dec. 14, 2012.
Sudhakar Paulzagade, et al; Systems and Methods for Modifying Track Logs During Restore Processes; U.S. Appl. No. 14/283,742, filed May 21, 2014.
Aeham Abushwashi; Systems and Methods for Maintaining Aggregate Tables in Databases; U.S. Appl. No. 14/447,619, filed Jul. 31, 2014.
Lagoze, Carl et al., "Metadata aggregation and "automated digital libraries": A retrospective on the NSDL experience", http://arxiv.org/ftp/cs/papers/0601/0601125.pdf, as accessed May 1, 2014, (2006).
Steve A. Vranyes, et al; Systems and Methods for Aggregating Information-Asset Metadata from Multiple Disparate Data-Management Systems; U.S. Appl. No. 14/483,133, filed Sep. 10, 2014.
Karl Woodrow, et al; Systems and Methods for Utilizing Information-Asset Metadata Aggregated from Multiple Disparate Data-Management Systems; U.S. Appl. No. 14/483,136, filed Sep. 10, 2014.
"IF4IT, The International Foundation for Information Technology", http://www.if4it.com/SYNTHESIZED/DISCIPLINES/Information_Asset_Management_Home_Page.html, as accessed May 1, 2014, (2009).
Soares, Sunil "Big Data Governance", http://dama-ny.com/images/meeting/101713/Presentation_deck/damanyc_bigdatagovernance17_october_2013.pdf, as accessed May 1, 2014, Information Asset, LLC, (Oct. 17, 2013).
"IAPMS (Information Asset Portfolio Management System)", http://www.iapms-home.com/, as accessed May 1, 2014, (2012).
"Streamline E-Discovery Collections Management Process", http://falcondiscovery.com/resources/case-studies/streamline-ediscovery-collections-management-process-2/, as accessed May 1, 2014, Falcon Discovery, (Oct. 6, 2011).
"ediscovery.com", http://www.ediscovery.com/eu/solutions/collect/, as accessed May 1, 2014, Kroll Ontrack Inc., (2014).
"Corporations Optimize Cost-effective E-discovery", http://www.hds.com/assets/pdf/hitachi-corporations-optimize-cost-effective-e-discovery.pdf, as accessed May 1, 2014, Solution Profile, Hitachi Data Systems Corporation, (Jan. 2012).
"Optimizing Resources for Efficient eDiscovery", http://www.novitex.com/pdfs/white-papers/White-Paper_Legal_Efficient%20eDiscovery_PBMS00101.pdf, as accessed May 1, 2014, White Paper, Pitney Bowes Inc., (2012).
"HP Autonomy", http://www.autonomy.com/, as accessed May 1, 2014, Hewlett-Packard, (Oct. 29, 1996).
"CommVault® Simpana Software", http://www.commvault.com/simpana-software, as accessed May 1, 2014, (Jul. 5, 2012).
"Proofpoint", http://www.proofpoint.com/, as accessed May 1, 2014, (Nov. 28, 2001).
"Nuix", http://www.nuix.com/, as accessed May 1, 2014, (Jan. 7, 2007).
"Varonis", http://www.varonis.com/, as accessed May 1, 2014, (Aug. 31, 2004).
"InfoSphere Platform", http://www-01.ibm.com/software/data/infosphere/, as accessed May 1, 2014, IBM, (Jan. 8, 2009).
"Acaveo", http://www.acaveo.com/, as accessed May 1, 2014, (Feb. 2, 2011).
"ZyLAB", http://www.zylab.com/, as accessed May 1, 2014, (Dec. 29, 1996).
"Imperva", http://www.imperva.com/, as accessed May 1, 2014, (Feb. 16, 2004).
"NTP Software", http://www.ntpsoftware.com/, as accessed May 1, 2014, (Dec. 20, 1996).
"APTARE", http://www.aptare.com/, as accessed May 1, 2014, (1993).
"TITUS", http://www.titus.com/, as accessed May 1, 2014, (Dec. 7, 1998).
"Index Engines", http://www.indexengines.com/, as accessed May 1, 2014, (Mar. 20, 2004).
"Duplicate Image Finder", http://www.alldup.de/delete_duplicate_files/duplicate_image_finder.htm, as accessed May 1, 2014, AllDup, Michael Thummerer Software Design, (2000).

(56) References Cited

OTHER PUBLICATIONS

V.Laurie, "Best Free Duplicate File Remover", http://www.techsupportalert.com/best-free-duplicate-file-remover.htm, as accessed May 1, 2014, (Jul. 4, 2014).
"CloneSpy", http://www.clonespy.com/, as accessed May 1, 2014, (Aug. 5, 2001).
"Symantec Data Insight", http://www.symantec.com/data-insight, as accessed May 1, 2014, Symantec Corporation, (1995).
U.S. Appl. No. 61/805,513, filed Mar. 26, 2013, Barinov.
CommVault® Simpana Software; http://www.commvault.com/simpana-software, as accessed May 1, 2014.
Apache Spark, a Fast Big Data Analytics Engine; https://bighadoop.wordpress.com/2014/04/03/apache-spark-a-fast-big-data-analytics-engine/, as accessed May 1, 2014.
Dourish, Paul, et al., "Extending Document Management Systems with User-Specific Active Properties", ACM Transactions on Information Systems, vol. 18, No. 2, Apr. 2000, pp. 140-170.
Microsoft Computer Dictionary, 5th Edition, Microsoft Press, Redmond, WA, 2002, pp. 67-68.
Random House Webster's College Dictionary, Random House, New York, NY, Apr. 2000, pp. 25 and 1429.
Michael Main, et al., Data Structures & Other Objects Using C++, 2nd Edition, Addison Wesley, Boston, MA, 2001, pp. 91-92.

\* cited by examiner

SYSTEMS AND METHODS FOR AUTOMATED AGGREGATION OF INFORMATION-SOURCE METADATA

CROSS REFERENCE TO RELATED APPLICATION

This application claims priority to U.S. Provisional Application No. 61/988,213, titled "SYSTEMS AND METHODS FOR AGGREGATING DISPARATE INFORMATION ASSETS SOURCED BY MULTIPLE COLLECTORS AND DATA MANAGEMENT SOLUTIONS" and filed 4 May 2014, the disclosure of which is incorporated, in its entirety, by this reference.

BACKGROUND

Modern organizations and entities manage large volumes of information in the form of files, e-mails, documents, file archives, etc. These information assets may be stored across a variety of information sources. Organizations typically make use of data-management systems to manage, sort, and/or categorize the various information sources that are managed by the organization. For example, a data-management system may track the identity, physical location, and/or type of each information source that is managed by the data-management system. Such data-management systems typically require a complete understanding of the information sources within their domain in order to provide full data-management capabilities.

However, organizations frequently make use of transient information sources, such as virtual machines. Moreover, more permanent information sources, such as servers, may be added or removed from an organization on a regular basis. Further, information sources may be geographically distant from each other, and different information sources may be supervised by different data-management systems. Some conventional methods of tracking information sources typically require manual input or management of source lists. Other conventional methods for synchronizing information across data-management systems may be prone to errors and may not capture information from a given information source. These shortcomings may result in an incomplete view of the information sources across an organization. Accordingly, the instant disclosure identifies and addresses a need for additional and improved systems and methods for automatically aggregating information-source metadata.

SUMMARY

As will be described in greater detail below, the instant disclosure describes various systems and methods for automated aggregation of information-source metadata by extracting the information-source metadata from the metadata of information assets. In one example, a method for automatically aggregating information-source metadata may include (1) receiving, from a data-management system that manages information assets of an entity (e.g., an organization) in a domain, metadata of an information asset, the metadata of the information asset having been generated (e.g., derived or gathered) by the data-management system, (2) determining that the metadata of the information asset includes metadata of an information source that contains the information asset, (3) extracting the metadata of the information source from the metadata of the information asset, (4) storing the metadata of the information source in an information-source metadata repository that is separate and distinct from the data-management system such that the metadata of the information source is associated with the information source, and (5) providing access to the metadata of the information source stored in the information-source metadata repository to (a) the data-management system, (b) an additional data-management system that manages information assets of the entity in an additional domain that is separate and distinct from the domain, and/or (c) the entity. In some examples, storing the metadata of the information source in the information-source metadata repository may include associating the information asset with the information source in the information-source metadata repository. In one embodiment, the domain may contain the information source, and the additional domain may not contain the information source.

In one embodiment, the method may further include (1) receiving, from the additional data-management system, metadata about an additional information asset, the metadata of the additional information asset having been generated by the additional data-management system, (2) determining that the metadata of the additional information asset includes metadata of an additional information source that contains the additional information asset, (3) extracting the metadata of the additional information source from the metadata of the additional information asset, (4) storing the metadata of the additional information source in the information-source metadata repository that is separate and distinct from the additional data-management system such that the metadata of the additional information source is associated with the additional information source, and (5) providing access to the metadata of the additional information source stored in the information-source metadata repository to (a) the data-management system, (b) the additional data-management system, and/or (c) the entity.

In other embodiments, the method may further include (1) receiving metadata about an additional information asset from the additional data-management system, the metadata of the additional information asset having been generated by the additional data management system, (2) determining that the metadata of the additional information asset comprises metadata of an additional information source that contains the additional information asset, (3) determining that the additional information asset is the information source, (4) storing the metadata of the additional information source in the global metadata repository that is separate and distinct from the additional data-management system such that the metadata of the additional information source is associated with the additional information source, and (5) storing the metadata of the additional information asset in the information-source metadata repository such that the metadata of the additional information asset is associated with the information source.

In some embodiments, the additional data-management system may be configured to request a list of information sources from the information-source metadata repository. In some examples, providing access to the metadata of the information source stored in the information-source metadata repository may include providing a list of information sources to the additional data-management system.

In some cases, the data-management system may generate the metadata of the information asset (e.g., by deriving or extracting the metadata from the information asset and/or by gathering the metadata from the information source) while performing routine operations on the information source. In one embodiment, the metadata of the information asset may include a fully qualified path of the information asset, and extracting the metadata of the information source from the metadata of the information asset may include extracting the metadata of the information source from the fully qualified path of the information asset. In some examples, the metadata of the information source may include a unique identifier of the information source. Additionally or alternatively, the metadata of the information source may include a physical location of the information source. Moreover, the metadata of the information source may include a type of the information source and/or information that identifies an owner of the information source.

In some examples, the method may further include (1) receiving additional metadata about the information asset from the additional data-management system, the additional metadata having been generated by the additional data-management system, (2) determining that the additional metadata of the information asset comprises an additional unique identifier of the information source, (3) extracting the additional unique identifier of the information source from the additional metadata of the information asset, and (4) storing the additional unique identifier of the information source in the information-source metadata repository such that the additional unique identifier of the information source is associated with the information source.

In one embodiment, a system for implementing the above-described method may include (1) a receiving module, stored in memory, that receives, from a data-management system that manages information assets of an entity in a domain, metadata of an information asset, the metadata of the information asset having been generated by the data-management system, (2) a determination module, stored in memory, that determines that the metadata of the information asset includes metadata of an information source that contains the information asset, (3) an extraction module, stored in memory, that extracts the metadata of the information source from the metadata of the information asset, (4) a storing module, stored in memory, that stores the metadata of the information source in an information-source metadata repository that is separate and distinct from the data-management system such that the metadata of the information source is associated with the information source, (5) a provisioning module, stored in memory, that provides access to the metadata of the information source stored in the information-source metadata repository to (a) the data-management system, (b) an additional data-management system that manages information assets of the entity in an additional domain that is separate and distinct from the domain, and/or (c) the entity, and (6) at least one physical processor configured to execute the receiving module, the determination module, the extraction module, the storing module, and the provisioning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a data-management system that manages information assets of an entity in a domain, metadata of an information asset, the metadata of the information asset having been generated by the data-management system, (2) determine that the metadata of the information asset includes metadata of an information source that contains the information asset, (3) extract the metadata of the information source from the metadata of the information asset, (4) store the metadata of the information source in an information-source metadata repository that is separate and distinct from the data-management system such that the metadata of the information source is associated with the information source, and (5) provide access to the metadata of the information source stored in the information-source metadata repository to (a) the data-management system, (b) an additional data-management system that manages information assets of the entity in an additional domain that is separate and distinct from the domain, and/or (c) the entity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
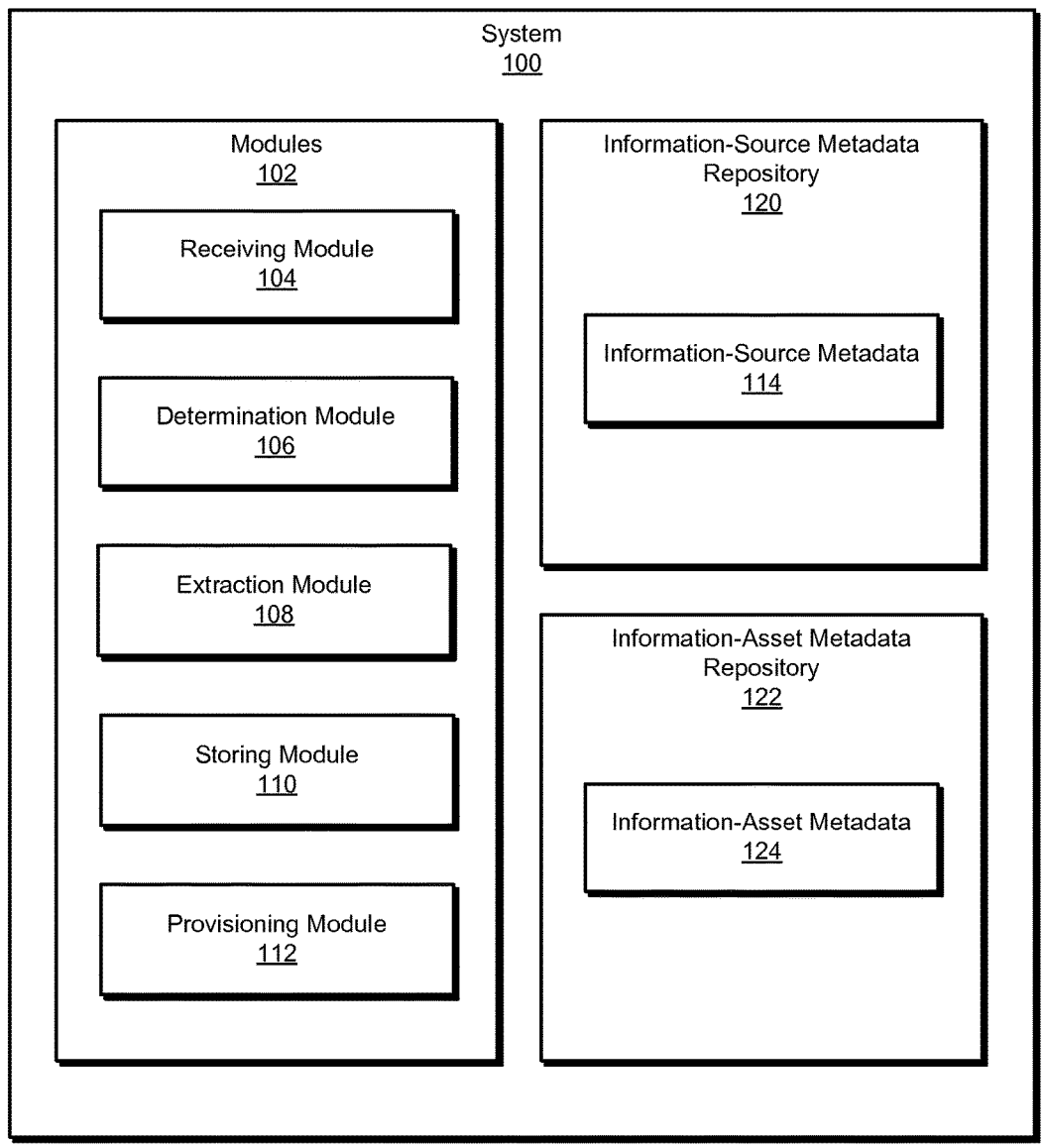
FIG. 1 is a block diagram of an exemplary system for automated aggregation of information-source metadata.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for the automated aggregation of information-source metadata. As will be explained in greater detail below, the systems described herein may enable a computing device to automate the aggregation of information-source metadata to provide a complete view of the information sources managed by an organization or any other entity. Such automated aggregation of information-source metadata may enable an organization to easily maintain a complete view of its information sources, regardless of the nature of the information sources and/or the way in which they are managed by disparate data-management systems.

Figure 2:
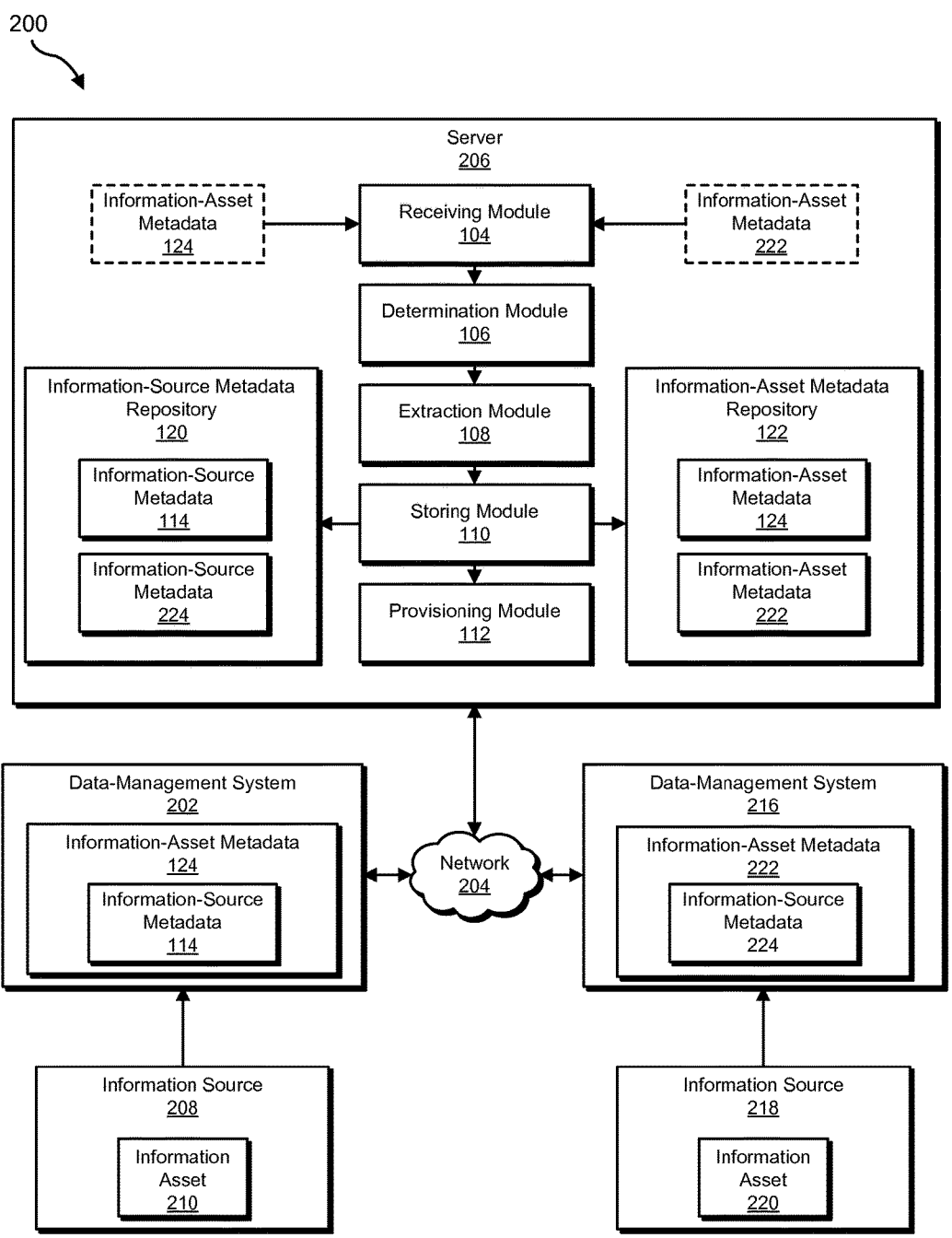
FIG. 2 is a block diagram of an additional exemplary system for automated aggregation of information-source metadata.
Figure 4:
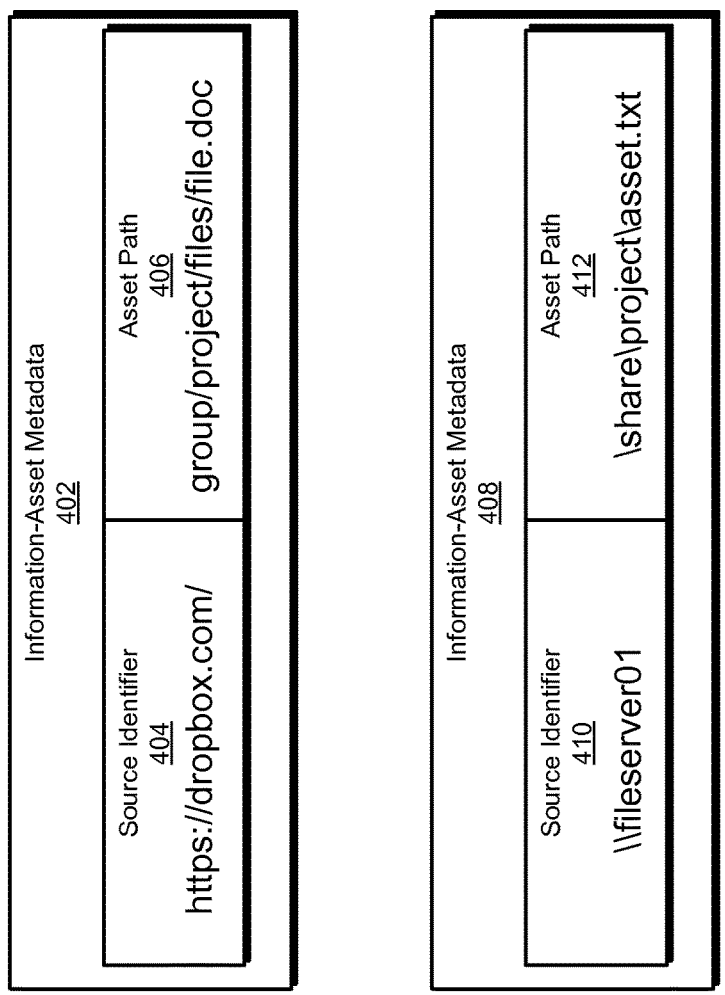
FIG. 4 is a block diagram of exemplary information-asset and information-source metadata.
Figure 5:
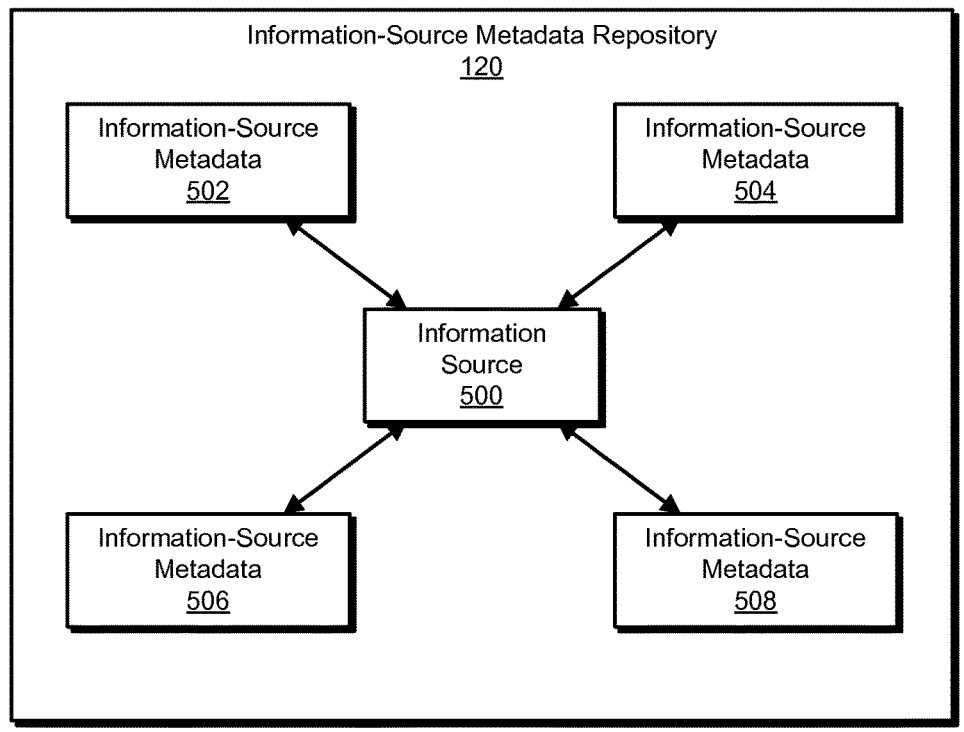
FIG. 5 is a block diagram of an exemplary computing system for aggregating multiple instances of metadata of an information source.

The following will provide, with reference to FIGS. 1, 2, and 5, detailed descriptions of exemplary systems for automated aggregation of information-source metadata. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for aggregating information-source metadata. As illustrated in this figure, exemplary system 100 may include one or more of modules 102 for performing one or more tasks. For example, and as will be explained in greater detail below, exemplary system 100 may include a receiving module 104 that may receive, from a data-management system that manages information assets of an entity in a domain, metadata of an information asset, the metadata of the information asset having been generated by the data-management system. Exemplary system 100 may additionally include a determination module 106 that may determine that the metadata of the information asset includes metadata of an information source that contains the information asset. Exemplary system 100 may further include an extraction module 108 that may extract the metadata of the information source from the metadata of the information asset. Exemplary system 100 may additionally include a storing module 110 that may store the metadata of the information source in an information-source metadata repository that is separate and distinct from the data-management system such that the metadata of the information source may be associated with the information source. Exemplary system 100 may also include a provisioning module 112 that may provide access to the metadata of the information source stored in the information-source metadata repository to the data management-system, an additional data-management system, and/or the entity. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks. As illustrated in FIG. 1, exemplary system 100 may also include one or more databases, such as information-source metadata repository 120 and/or information-asset metadata repository 122. In some embodiments, information-source metadata repository 120 may be configured to store metadata that describes various attributes of information sources associated with an entity. For example, information-source metadata repository 120 may store information-source metadata 114. In other embodiments, information-asset metadata repository 122 may be configured to store metadata that describes various attributes of information assets that are stored by information sources associated with an entity. For example, information-asset metadata repository 122 may store information-asset metadata 124.

Information-source metadata repository 120 may represent portions of a single database or computing device or a plurality of databases or computing devices. For example, information-source metadata repository 120 may represent a portion of server 206 in FIG. 2, computing system 610 in FIG. 6, and/or portions of exemplary network architecture 700 in FIG. 7. Alternatively, information-source metadata repository 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Information-asset metadata repository 122 may represent portions of a single database or computing device or a plurality of databases or computing devices. For example, information-asset metadata repository 122 may represent a portion of server 206 in FIG. 2, computing system 610 in FIG. 6, and/or portions of exemplary network architecture 700 in FIG. 7. Alternatively, information-asset metadata repository 122 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a data-management system 202 and a data-management system 216 in communication with a server 206 via a network 204. In one example, data-management system 202 or 216 may be programmed with one or more of modules 102 and/or may store all or a portion of the data in information-source metadata repository 120 and/or information-asset metadata repository 122. Additionally or alternatively, server 206 may be programmed with one or more of modules 102 and/or may store all or a portion of the data in information-source metadata repository 120 and/or information-asset metadata repository 122.

In one embodiment, one or more of modules 102 from FIG. 1 may, when executed by at least one processor of server 206, enable server 206 to collect and store information about various information sources. In some embodiments, and as will be described in greater detail below, one or more of modules 102 may cause server 206 to aggregate information-source metadata. For example, receiving module 104 may receive information-asset metadata 124 of an information asset 210, from data-management system 202 that manages information assets of an entity in a domain. Information-asset metadata 124 of information asset 210 may have been generated by data-management system 202. Determination module 106 may determine that information-asset metadata 124 includes information-source metadata 114 of an information source 208 that contains information asset 210. Extraction module 108 may extract information-source metadata 114 from information-asset metadata 124. Storing module 110 may store information-source metadata 114 in information-source metadata repository 120 that is separate and distinct from data-management systems 202 and 216 such that information-source metadata 114 is associated with information source 208. Storing module 110 may additionally store information-asset metadata 124 in information-asset metadata repository 122. Provisioning module 112 may then provide access to information-source metadata 114 stored in the information-source metadata repository 120 to data-management system 202, data-management system 216, and/or the entity.

In some examples and as will be described in greater detail below, provisioning module 112 may provide access to information-source metadata repository 120 to data-management system 202 and/or data-management system 216. As will also be described in greater detail below, receiving module 104 may further receive information-asset metadata 222 of information asset 220 on an information source 218 from data-management system 216. Determination module 106 may determine that information-asset metadata 222 contains information-source metadata 224 of information source 218, and extraction module 108 may accordingly extract information-source metadata 224 from information-asset metadata 222. As will also be described in greater detail below, storing module 110 may store information-source metadata 224 in information-source metadata repository 120 in association with information source 218, and provisioning module 112 may provide access to information-source metadata 224 in a variety of ways.

Data-management systems 202 and 216 generally represent any type or form of computing device that is capable of reading computer-executable instructions and/or performing data-management operations. Examples of data-management systems 202 and 216 include, without limitation, application servers and database servers configured to provide various database services and/or run certain software applications.

Server 206 generally represents any type or form of computing device that is capable of storing an aggregation of information-source metadata and/or providing the information-source metadata to other systems and/or computing devices. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing data-management system 202, data-management system 216, and server 206.

Information sources 208 and 218 generally represent any type or form of computing device capable of reading computer-executable instructions and/or any type or form of storage device or system capable of storing and/or managing information assets. Examples of information sources 208 and 218 include, without limitation, application servers, file servers, email servers, web servers, computing system 610 in FIG. 6, and/or portions of exemplary network architecture 700 in FIG. 7.

Figure 3:
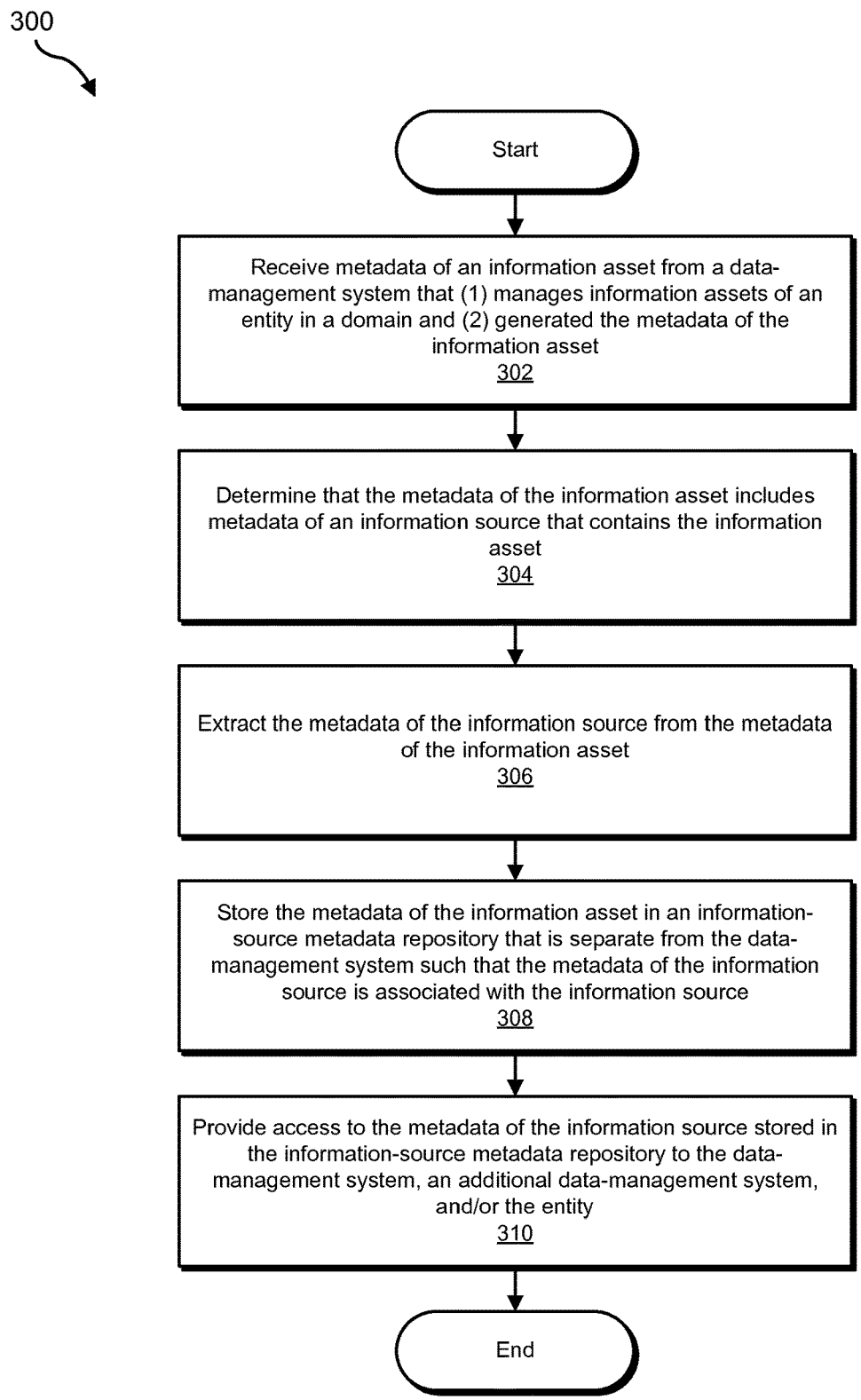
FIG. 3 is a flow diagram of an exemplary method for automated aggregation of information-source metadata.

FIG. 3 is a flow diagram of an exemplary computer-implemented method 300 for automated aggregation of information-source metadata. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive metadata of an information asset from a data-management system that (1) manages information assets of an entity in a domain and (2) generated the metadata of the information asset. For example, receiving module 104 may, as part of server 206 in FIG. 2, receive information-asset metadata 124 of information asset 210 from data-management system 202 that generated information-asset metadata 124 while managing information assets contained within information source 208.

Receiving module 104 may receive information-asset metadata from any of a variety of data-management systems that manage an entity's information assets. The term, "data-management system," as used herein, generally refers to any system, hardware, or software that generates information-asset metadata from which information-source metadata may be extracted while scanning, cataloging, archiving, or otherwise managing a set of information assets. A data-management system may generate information-asset metadata while performing operations in response to a request from a user. Additionally or alternatively, a data-management system may generate information-asset metadata while executing its functions according to a pre-determined schedule, heuristic, or upon recognizing a particular event (e.g., an anti-virus product may generate information-asset metadata while scanning a recently downloaded file).

A data-management system may generate information-asset metadata in a variety of ways. In some examples, a data-management system may extract metadata of an information asset from the information asset. In other examples, a data-management system may obtain metadata of the information asset from the information source that contains the information asset. In further examples, the data-management system may use a combination of information from an information asset and the information source that contains the information asset to derive the metadata of the information asset.

Examples of data-management systems include, without limitation, systems that protect, organize, and/or store information assets (e.g., file systems, email systems, document systems, storage systems, backup systems, archival systems, replication systems, high-availability systems, data-search systems, data-lifecycle-management systems, and virtualization systems) and systems that control access to information assets (e.g., data-loss-prevention systems, identity-authentication systems, access-control systems, encryption systems, policy-compliance systems, risk-reduction systems, intrusion-prevention systems, unstructured-data-governance systems, and electronic-discovery systems). In some examples, the term "data-management system" may refer to a cloud-computing environment that provides various data-management services via the Internet. In the example of FIG. 2, data-management system 202 may represent a data-loss prevention application that performs daily scans of information assets stored on information source 208. As used herein, the term "entity" generally refers to any organization (e.g., a business or government unit), individual, group of related individuals, department within an organization, computing device, collection of computing devices, or computing system.

The term, "information asset," as used herein, generally refers to any meaningful block of data that is managed or organized as a single item. Examples of information assets may include, without limitation, files, e-mails, documents, messages, audio, videos, file archives, databases, database tables, database files, containers, folders, backups, disks, virtual-machine disk files, database servers, mail servers, mailboxes, or any other meaningful block of data. With further reference to FIG. 2, information asset 210 may represent a text document stored on information source 208. An entity's information assets may be stored across a variety of information sources.

The term, "information source," as used herein, generally refers to any device or group of devices that hosts an information asset. An information source may be a physical device, such as a server or mobile computing device. Additionally or alternatively, an information source may be a non-physical device, such as a virtual machine. Other examples of information sources may include, without limitation, file servers, application servers, email servers, document repositories, cloud-based storage services, hard drives, e-mail services, computing devices, social networks, or any other suitable device that is used to store information assets.

As part of managing information assets, data-management systems may generate and maintain a variety of information-asset metadata. The term "metadata," as used herein, may refer to any characteristic or attribute of an information asset that provides information about the information asset. Examples of information-asset metadata may include, without limitation, names, data types, ages, creation attributes, access permissions, modification attributes, size attributes, location attributes, relationship attributes, usage attributes, ownership attributes, reputation attributes, permission attributes, classifications, tags, fingerprints, and life-cycle attributes.

The term "metadata," as used herein, may also refer to any characteristic or attribute of an information source that provides information about the information source. As will be described in greater detail below, the metadata of an information asset may contain (1) metadata of an information source that contains the information asset and/or (2) information from which metadata of the information source that contains the information asset may be derived. Some examples of such information-source metadata include, without limitation, source types, identifiers, names, and locations.

Data-management systems may manage information assets in a variety of domains. As used herein, the term "domain" may refer to a location at which information assets may be managed. For example, a domain may refer to a physical location, such as "California Office" or "First Floor Computing Cluster." In some examples, the term "domain" may refer to a particular geographic location or country. Additionally or alternatively, the term "domain" may refer to any unique set of information sources that may be managed by a data-management system. In some examples, the term "domain" may refer to any logical domain (e.g., a logical domain based on network or management partitioning). In at least one example, the term "domain" may refer to an availability domain.

In some examples, the term "domain," as used herein, may refer to any area or field of data management. Examples of data-management domains include, without limitation, a file domain, an email domain, a document domain, a storage domain, a backup domain, an archival domain, a replication domain, a high-availability domain, a data-search domain, a virtualization domain, a data-loss-prevention domain, an identity-authentication domain, an access-control domain, an encryption domain, a policy-compliance domain, an intrusion-prevention domain, an unstructured-data-governance domain, an electronic discovery domain, and/or a cloud-computing domain.

In addition to receiving metadata from data-management systems, receiving module 104 may gather metadata of information assets by directly scanning the sources of the information assets. In one example, receiving module 104 may scan an information source to identify the information assets stored therein. In some examples, receiving module 104 may periodically scan some or all of the information sources within an entity's environment to ensure that each information source of an entity is represented in a global metadata repository (e.g., information-source metadata repository 120) and/or to ensure that the metadata stored in the global metadata repository is complete and up to date.

In some examples, two data-management systems may be considered to manage information assets in separate and distinct domains if the two data-management systems manage, cover, touch, or scan differing sets of information sources. For example, two data-management systems may be considered to manage information assets in separate and distinct domains if they manage information assets at different physical locations even if they also manage information assets in the same area or field of data management. Additionally or alternatively, two data-management systems may be considered to manage information assets in separate and distinct domains if the information-source metadata that may be extracted from the information-asset metadata that is generated by one of the two data-management systems differs from the information-source metadata that may be extracted from the information-asset metadata that is generated by the other of the two data-management systems.

Returning to FIG. 3, receiving module 104 may receive metadata of information assets in a variety of ways. In some examples, receiving module 104 may receive metadata of an information asset from a data-management system that generates the metadata of the information asset as part of performing a routine operation on the information asset or an information source that contains the information asset. For example, receiving module 104 may receive metadata of an information asset from an anti-virus product that generated the metadata while performing a regularly scheduled scan for malicious software. In another example, receiving module 104 may receive metadata of an information asset from an archival service that regularly archives information assets that are stored on an information source. In this example, the archival service may have generated the metadata of the information asset while performing an archival operation that included the information asset. In other examples, receiving module 104 may receive metadata of an information asset from a data-management system that is performing a one-time operation, such as a manually initiated intelligent search operation, that includes an information source.

In some examples, receiving module 104 may receive metadata about information assets from multiple data-management systems that manage information assets of an entity in separate and distinct domains. For example and with reference to FIG. 2, receiving module 104 may receive information-asset metadata 124 from data-management system 202 and information-asset metadata 222 from data-management system 216. As will be described in greater detail below, by receiving information-asset metadata from some or all of the data-management systems that manage the information assets of an entity in separate and distinct domains, the systems described herein may detect and extract information-source metadata of each information source touched by the data-management systems.

Returning to FIG. 3 at step 304, one or more of the systems described herein may determine that the metadata of the information asset received at step 302 includes metadata of an information source that contains the information asset. For example, determination module 106 may, as part of server 206 in FIG. 2, determine that information-asset metadata 124 includes information-source metadata 114.

Determination module 106 may determine that information-asset metadata contains information-source metadata in a variety of ways. In one example, determination module 106 may determine that metadata of an information asset contains metadata of an information source by detecting that the metadata of the information asset contains a fully qualified path of the information asset. After detecting that the metadata of the information asset contains a fully qualified path of the information asset, determination module 106 may use the fully qualified path of the information asset to identify various kinds of metadata of the information source that contains the information asset. For example, determination module 106 may identify an identifier of an information source within a fully qualified path of an information asset. In other examples, determination module 106 may identify a type of an information source within a fully qualified path of an information asset.

As used herein, the term "fully qualified path" generally refers to any path of an information asset that includes an identifier of the information source that contains the information asset. Examples of fully qualified paths include, without limitation, Uniform Resource Identifiers (URIs), Uniform Resource Locators (URLs), Common Internet File System (CIFS) file paths (e.g., "\\server\share\folder\item.txt"), Network File System (NFS) paths (e.g., "nfs:/server:port/path"), HyperText Transfer Protocol (HTTP) paths (e.g., "https://app.box.com/files/0/f/119057557/O3_docs" or "https://www.nortonzone.com/file_manager/44878509"), File Transfer Protocol (FTP) paths, and LOTUS NOTES paths (e.g., "notes://server/path").

Some fully qualified paths may be well defined and/or may follow well-characterized formats. For example, a fully qualified path beginning with "\\server_name" may point to an information asset located on a CIFS server named "server_name," a fully qualified path beginning with "nfs://server_name" may point to an information asset located on a NFS server named "server_name," a fully qualified path beginning with "notes://server_name" may point to an information asset located on a LOTUS NOTES server named "server_name," and a fully qualified path beginning with "http://domain_name" may point to an information asset located on a cloud-based storage solution named "domain_name." Since some fully qualified paths may be well defined and/or may follow well-characterized formats, determination module 106 may use conventional text-parsing methods to identify an identifier and/or a type of an information source from a fully qualified path of an information asset.

Using FIG. 4 as an example, determination module 106 may determine that information-asset metadata 402 contains information-source metadata. In this example, information-asset metadata 402 may have been generated by a data-management system that scans an organization's cloud-based storage solutions. As shown in FIG. 4, information-asset metadata 402 may represent a fully qualified URL that (1) points to an information asset named "file.doc" that is stored on a cloud-based storage solution, DROPBOX, and (2) contains a source identifier 404 of the cloud-based storage solution and an asset path 406. In this example, determination module 106 may determine that information-asset metadata 402 contains information-source metadata by parsing source identifier 404 (In this example, "https://dropbox.com/") from information-asset metadata 402. Determination module 106 may then utilize source identifier 404 to determine the name and type of the information source that contains the information asset. In this example, determination module 106 may determine that the segment "https://" within source identifier 404 signals that the information source is accessed via the Secure Hypertext Transfer Protocol (HTTPS) over the Internet. Moreover, determination module 106 may determine that the segment "dropbox.com" within source identifier 404 signals that the information source is named DROPBOX. Determination module 106 may accordingly determine that information-asset metadata 402 is associated with an information asset hosted on an Internet-based information source named DROPBOX.

As a further example, and with continuing reference to FIG. 4, determination module 106 may determine that information-asset metadata 408 contains information-source metadata. In this example, information-asset metadata 408 may represent a fully qualified path that (1) points to an information asset bearing the name "asset.txt" that is stored on a CIFS server named "fileserver01" and (2) contains a source identifier 410 of the CIFS server and an asset path 412. In this example, determination module 106 may parse source identifier 410 from information-asset metadata 408. Determination module 106 may then utilize source identifier 410 to determine the name and type of the information source that contains the information asset. In this example, determination module 106 may determine that source identifier 410 indicates that the information asset is stored on a CIFS server named "fileserver01."

In some examples, determination module 106 may determine that information-asset metadata contains information-source metadata by (1) determining that the information-asset metadata includes an unique identifier of the information asset such as a global identifier or token of the information asset and (2) determining that the unique identifier of the information asset contains a source identifier or token that identifies the information source that stores the information asset. In at least one example, determination module 106 may determine that information-asset metadata contains information-source metadata by determining that the information-asset metadata is labeled as information-source metadata. For example, determination module 106 may determine that metadata of an information asset contains an identifier, a type, a physical location, and/or ownership information of an information source that contains the information asset by determining that the metadata of the information asset has been labeled as such by the data-management system that reported the metadata of the information asset.

At step 306, one or more of the systems described herein may extract the metadata of the information source identified at step 304 from the metadata of the information asset received at step 302. For example, extraction module 108 may, as part of server 206 in FIG. 2, extract information-source metadata 114 of information source 208 from information-asset metadata 124 of information asset 210.

Extraction module 108 may extract any or all of the metadata of an information source that has been identified by determination module 106 at step 304. For example, extraction module 108 may extract an identifier, a type (e.g., cloud-based storage solution, CIFS server, etc.), a physical location, and/or ownership information of an information source that has been identified within the metadata of an information asset by determination module 106 at step 304.

Returning to FIG. 3 at step 308, one or more of the systems described herein may store the metadata of the information source in an information-source metadata repository that is separate and distinct from the data-management system such that the metadata of the information source is associated with the information source. For example, storing module 110 may, as part of server 206 in FIG. 2, store information-source metadata 114 of information source 208 in information-source metadata repository 120 that is separate and distinct from data-management system 202 such that information-source metadata 114 of information source 208 is associated with information source 208.

Storing module 110 may store information-source metadata in an information-source repository in a variety of ways. In one example, storing module 110 may store the metadata of an information source in an information-source metadata repository by writing the metadata to the information-source metadata repository and by associating the metadata with a representation of the information source. Using FIG. 5 as an example, storing module 110 may write information-source metadata 502, 504, 506, and 508 (e.g., metadata of information source 208 in FIG. 2 that was extracted from various information-asset metadata as part of step 306) in information-source metadata repository 120 and may associate information-source metadata 502, 504, 506, and 508 with a single representation of information source 208 (in this example, information source 500). In at least one example, information-source metadata 502, 504, 506, and 508 in FIG. 5 may have been extracted from the metadata of two or more different information assets and/or may have been extracted from information-asset metadata received from two or more disparate data-management systems (e.g., two data-management systems that manage information assets and/or information sources in two different logical domains).

In some examples, storing module 110 may also associate the representation of the information source with a representation of the information asset whose metadata contained the metadata of the information source. Using FIG. 2 as an example, as part of storing information-source metadata 114 to information-source metadata repository 120 and associating information-source metadata 114 with a representation of information source 208, storing module 110 may associate the representation of information source 208 with a representation of information asset 210 whose information-asset metadata 124 contained information-source metadata 114.

In some examples, an information source may be considered by a data-management system as either an information source or an information asset depending on the domain in which it is viewed. For at least this reason, storing module 110 may determine whether an information source that stores information assets is itself an information asset of another information source (e.g., whether the information source is part of an information-source hierarchy). As one example, storing module 110 may determine that an e-mail inbox that stores e-mails is itself an information asset of another information source (e.g., an e-mail server). As a further example, storing module 110 may determine that a virtual machine that stores various files is itself an information asset (e.g., in the form of a virtual machine disk image (VMDK) file) of another information source (e.g., a file system).

Storing module 110 may determine that an information source that stores information assets is itself an information asset of another information source in a variety of ways. In one example, storing module 110 may determine that an information source is itself an information asset of another information source by determining that an identifier of the information source is contained in information-asset metadata as an information-asset identifier. In some examples, storing module 110 may use a pre-determined set of rules that map information-source identifiers to information-asset identifiers (e.g., a set of rules that map virtual machine identifiers to VMDK file identifiers) to determine that an identifier of an information source is contained in information-asset metadata as an information-asset identifier.

In some examples, an information source may be referenced by a data-management system using any number of identifiers depending on the domain in which it is viewed. For at least this reason, storing module 110 may associate the metadata of an information source with an existing representation of the information source in the information-source metadata repository by (1) determining that a representation of the information source exists in the information-source metadata repository and (2) associating the metadata of the information source with the existing representation of the information source. In one example, storing module 110 may determine that a representation of the information source exists in the information-source metadata repository by determining that a set of information assets, from whose metadata the metadata of the information source was extracted, is associated with an existing information-source representation in the information-source metadata repository. In this example, the fact that the information assets are associated with the existing information-source representation may indicate that the existing information-source representation represents the information source. Additionally or alternatively, if the metadata of the information source is an identifier of the information source, storing module 110 may determine that a representation of the information source exists in the information-source metadata repository by using a pre-determined set of rules that map one type of information-source identifier to another type of information-source identifier (e.g., a set of rules that map public identifiers to private identifiers) to determine that the identifier of the information source maps to another identifier that is associated with an existing representation of the information source contained in the information-source metadata repository.

Returning to FIG. 3 at step 310, one or more of the systems described herein may provide access to the metadata of the information source stored in the information-source metadata repository to the data-management system, an additional data-management system, and/or the entity. For example, provisioning module 112 may, as part of server 206 in FIG. 2, provide access to information-source metadata 114 of information source 208, stored in information-source metadata repository 120, to data-management system 202, data-management system 216, and/or an entity that owns or maintains information source 208, information source 218, information asset 210, or information asset 220.

Provisioning module 112 may provide access to information-source metadata in a variety of ways. For example, provisioning module 112 may push or send information-source metadata to a data-management system. In some examples, provisioning module 112 may push information-metadata to a data-management system without further action on the part of the data-management system. In some embodiments, a data-management system may be configured to pull a list of information sources from the information-source metadata repository. In such embodiments, provisioning module 112 may provide the data-management system with access to the information-source metadata repository. Since the systems described herein may receive information-asset metadata from different data-management systems that may target different sets of information sources, the list of information sources that is provided by provisioning module 112 may include a union of all of the information sources that are managed by the different data-management systems.

Using FIG. 2 as an example, storing module 110 may store information-source metadata 114 in association with information source 208 in information-source metadata repository 120. Storing module 110 may further store information-source metadata 224 in association with information source 218 in information-source metadata repository 120. Data-management system 202 may request a list of information sources from provisioning module 112. Provisioning module 112 may accordingly provide data-management system 202 with access to information-source metadata repository 120. In this example, data-management system 202 may discover information source 218 via information-source metadata repository 120.

In other examples, provisioning module 112 may provide access to the metadata of an information source to an entity that owns or maintains the information source and/or an entity that owns or maintains information assets contained within the information source. For example, a data-center administrator may want to determine the distribution of data across an organization's data centers. In this example, provisioning module 112 may provide the data-center administrator with access to metadata of the information sources within the organization's data centers in a variety of ways, including but not limited to passing information-source metadata to a graphic-representation program, an analysis program, a spreadsheet, a text document, or any other suitable method of conveying information-source metadata to the data-center administrator.

As described above, the systems described herein may enable a computing device to automate the aggregation of information-source metadata to provide a complete view of the information sources managed by an organization or any other entity. Such automated aggregation of information-source metadata may enable an organization to easily maintain a complete view of its information sources, regardless of the nature of the information sources and/or the way in which they are managed by disparate data-management systems.

For example, the systems described herein may (1) receive metadata of an information asset from a data-management system that (a) manages the information source on which the information asset is stored and (b) generated the metadata of the information asset, (2) determine that the metadata of the information asset includes metadata of the information source (e.g., an identifier of the information source and/or a type of the information source), (3) extract the metadata of the information source from the metadata of the information asset, (4) store the metadata of the information source in an information-source metadata repository that is separate and distinct from the data-management system, and (5) provide access to the metadata of the information source stored in the information-source metadata repository to (a) the data-management system, (b) an additional data-management system that does not know of the information source or the metadata of the information source, and/or (c) an entity that owns or maintains the information source.

Figure 6:
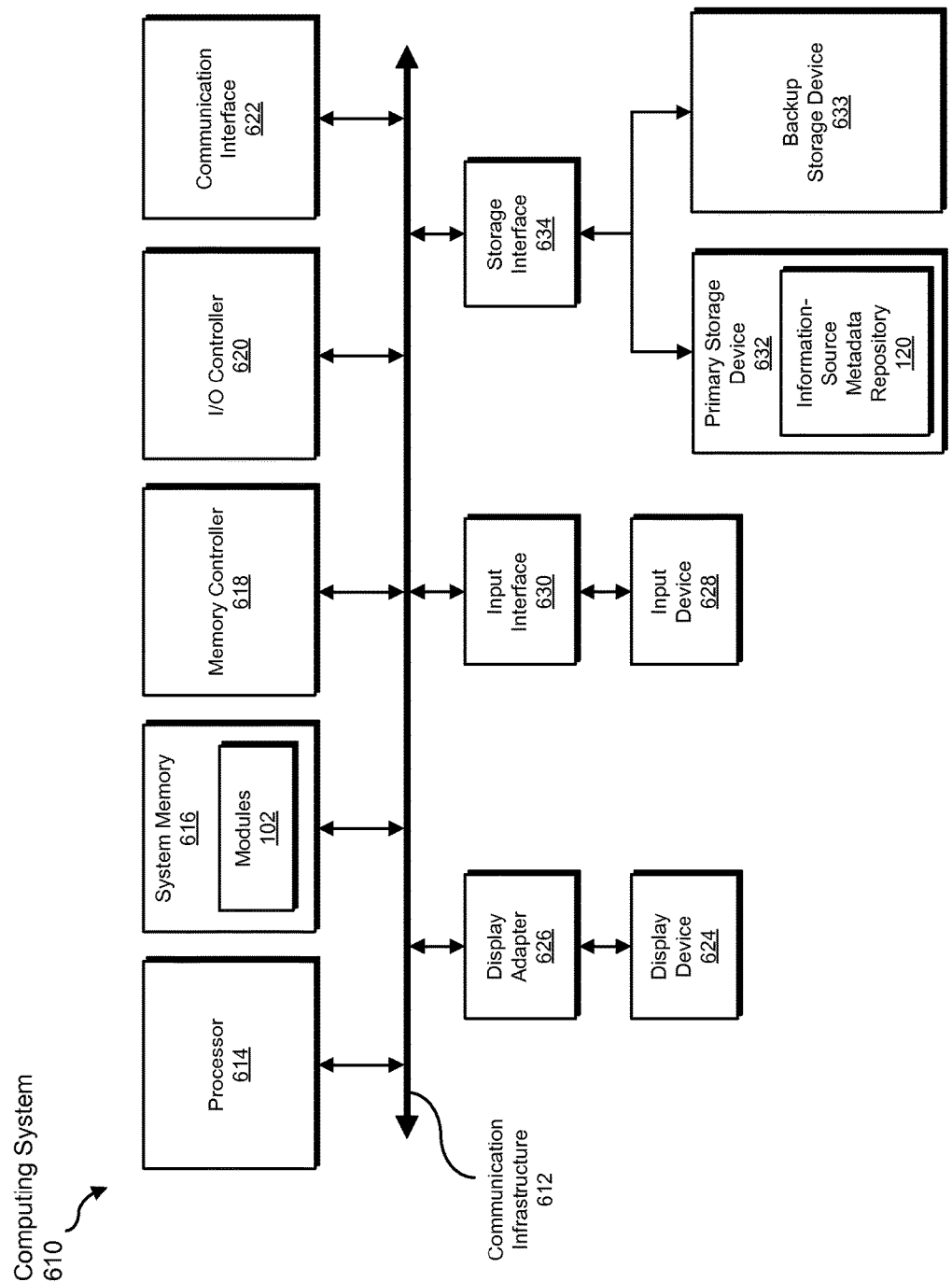
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, information-source metadata repository 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
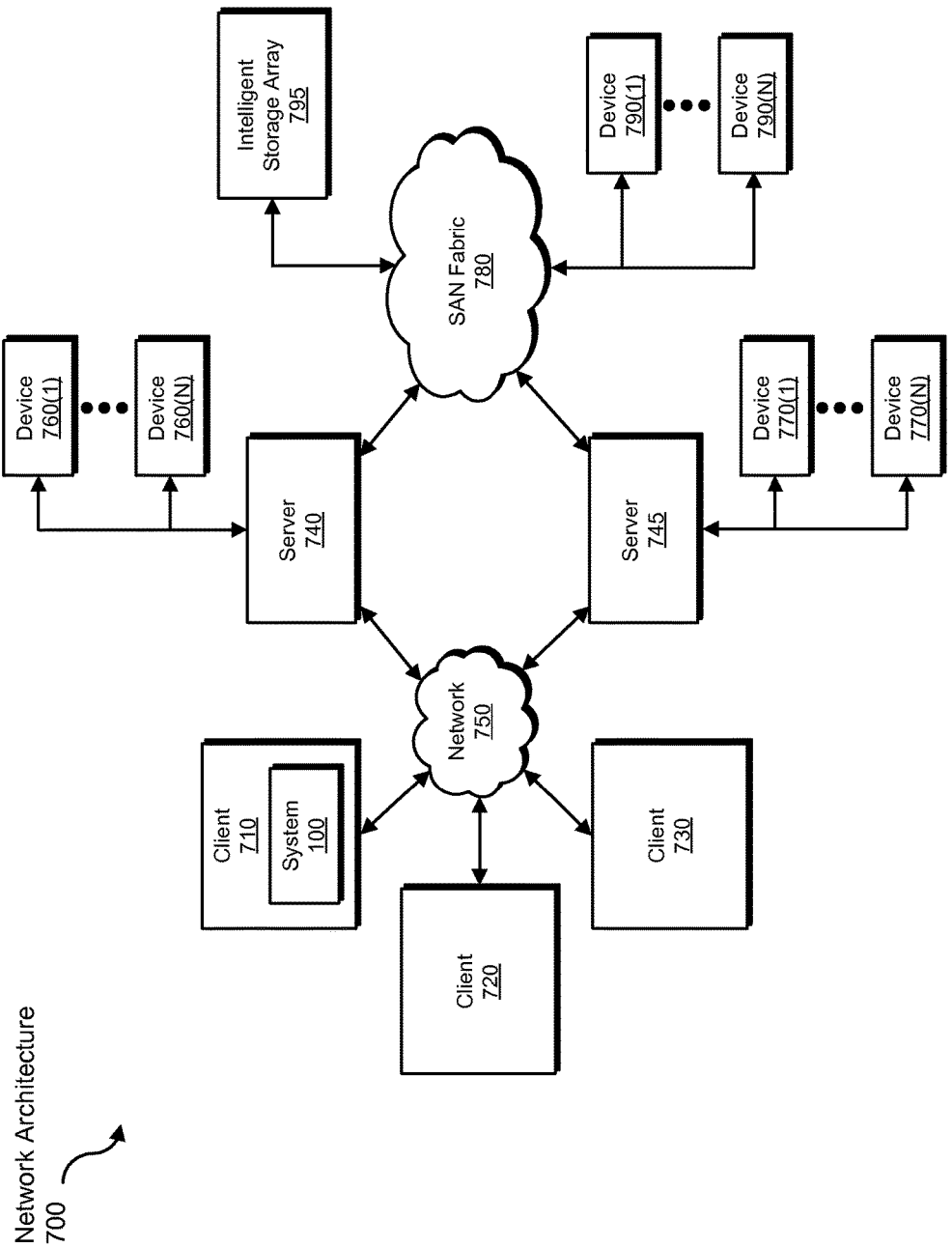
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automated aggregation of information-source metadata.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information-asset metadata to be transformed, transform the information-asset metadata into information-source metadata, output a result of the transformation to a global information-source metadata repository, use the result of the transformation to update a list of information sources, store the result of the transformation to a server, and/or output the result of the transformation to a user interface device such as a monitor. Additionally or alternatively, one or more of the modules recited herein may provide the results of the transformation to a second system that may use the information to execute further tasks, such as cataloguing the states of various information sources. Moreover, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated aggregation of information-source metadata, at least a portion of the method being performed by a computing device comprising at least one processor, the method comprising:

receiving, at a global information-source metadata repository, a digital representation of an information asset, wherein:
the digital representation of the information asset comprises metadata of the information asset;

the metadata of the information asset was received from and generated by a first data-management system that is configured to scan an information-asset source containing information assets of an entity;
the information-asset source is unknown to the global information-source metadata repository and a second data-management system that is configured to scan information assets of the entity;
the first data-management system and the second data-management system are different types of data-management systems that manage information assets of the entity in different fields of data management;
the first data-management system, the second data-management system, and the global information-source metadata repository are separate and distinct systems that are configured to operate independently; and
the metadata of the information asset has not been previously seen at the global information-source metadata repository;
transforming, at the global information-source metadata repository, the digital representation of the information asset into a digital representation for the information-asset source by:
discovering the information-asset source at the global information-source metadata repository by discovering metadata of the information-asset source within the metadata of the information asset, the metadata of the information-asset source having never been seen previously at the global information-source metadata repository;
extracting, at the global information-source metadata repository, the metadata of the information-asset source from the metadata of the information asset;
storing, at the global information-source metadata repository, a digital representation of the information-asset source; and
storing, at the global information-source metadata repository, the metadata of the information-asset source in association with the digital representation of the information-asset source such that the global information-source metadata repository contains a more complete view of the entity's information-asset sources; and
enabling the second data-management system to discover the information-asset source by providing, at the global information-source metadata repository, access to the metadata of the information-asset source to the second data-management system.

2. The method of claim 1, further comprising:
receiving, at the global information-source metadata repository from the second data-management system, a digital representation of an additional information asset, wherein:
the digital representation of the additional information asset comprises metadata about the additional information asset; and
the metadata of the additional information asset was generated by the second data-management system and not previously seen at the global information-source metadata repository;
transforming, at the global information-source metadata repository, the digital representation of the additional information asset into a digital representation for an additional information-asset source by:
discovering, at the global information-source metadata repository within the metadata of the additional information asset, metadata of the additional information-asset source that contains the additional information asset, the metadata of the additional information-asset source having never been seen previously at the global information-source metadata repository;
extracting, at the global information-source metadata repository, the metadata of the additional information-asset source from the metadata of the additional information asset;
storing, at the global information-source metadata repository, a digital representation of the additional information-asset source; and
storing, at the global information-source metadata repository, the metadata of the additional information-asset source in association with the digital representation of the additional information-asset source such that the global information-source metadata repository contains a more complete view of the information-asset sources of the entity; and
enabling the first data-management system to discover the additional information-asset source by providing, at the global information-source metadata repository, access to the metadata of the additional information-asset source to the first data-management system.

3. The method of claim 1, further comprising:
receiving, from the second data-management system, a digital representation of an additional information asset, wherein:
the digital representation of the additional information asset comprises metadata about the additional information asset; and
the metadata of the additional information asset was generated by the second data-management system;
determining that the metadata of the additional information asset comprises additional metadata of the information-asset source;
storing, at the global information-source metadata repository, the additional metadata of the information-asset source in association with the digital representation of the information-asset source; and
storing, at the global information-source metadata repository, the metadata of the additional information asset in association with the digital representation of the information-asset source.

4. The method of claim 1, wherein the second data-management system is configured to request a list of information-asset sources from the global information-source metadata repository.

5. The method of claim 1, wherein providing access to the metadata of the information-asset source comprises providing a list of information-asset sources to the second data-management system.

6. The method of claim 1, wherein the first data-management system generates the metadata of the information asset while performing routine operations on the information-asset source.

7. The method of claim 1 wherein:
the metadata of the information asset comprises a fully qualified path of the information asset;
extracting the metadata of the information-asset source from the metadata of the information asset comprises extracting the metadata of the information-asset source from the fully qualified path of the information asset.

8. The method of claim 1, wherein:
the first field of data management contains the information-asset source;

the second field of data management does not contain the information-asset source.

9. The method of claim 1, wherein the metadata of the information-asset source comprises a unique identifier of the information-asset source.

10. The method of claim 9, further comprising:
receiving, from the second data-management system, additional metadata of the information asset, the additional metadata of the information asset having been generated by the second data-management system;
determining that the additional metadata of the information asset comprises an additional unique identifier of the information-asset source;
extracting the additional unique identifier of the information-asset source from the additional metadata of the information asset;
storing, at the global information-source metadata repository, the additional unique identifier of the information-asset source in association with the digital representation of the information-asset source.

11. The method of claim 1, wherein the metadata of the information-asset source comprises a physical location of the information-asset source.

12. The method of claim 1, wherein the metadata of the information-asset source comprises a type of the information-asset source.

13. The method of claim 1, wherein the metadata of the information-asset source comprises information that identifies an owner of the information-asset source.

14. The method of claim 1, wherein storing the metadata of the information-asset source comprises associating, at the global information-source metadata repository, the digital representation of the information asset with the digital representation of the information-asset source.

15. A system for aggregating information-source metadata, the system comprising:
a receiving module, stored in memory, that receives, at a global information-source metadata repository, a digital representation of an information asset, wherein:
the digital representation of the information asset comprises metadata of the information asset;
the metadata of the information asset was received from and generated by a first data-management system that is configured to scan an information-asset source containing information assets of an entity;
the information-asset source is unknown to the global information-source metadata repository and a second data-management system that is configured to scan information assets of the entity;
the first data-management system and the second data-management system are different types of data-management systems that manage information assets of the entity in different fields of data management;
the first data-management system, the second data-management system, and the global information-source metadata repository are separate and distinct systems that are configured to operate independently; and
the metadata of the information asset has not been previously seen at the global information-source metadata repository;
a determination module, stored in memory, that discovers the information-asset source at the global information-source metadata repository by discovering metadata of the information-asset source within the metadata of the information asset, the metadata of the information-asset source having never been seen previously at the global information-source metadata repository;
an extraction module, stored in memory, that extracts, at the global information-source metadata repository, the metadata of the information-asset source from the metadata of the information asset;
a storing module, stored in memory, that transforms, at the global information-source metadata repository, the digital representation of the information asset into a digital representation for the information-asset source by:
storing, at the global information-source metadata repository, a digital representation of the information-asset source; and
storing, at the global information-source metadata repository, the metadata of the information-asset source in association with the digital representation of the information-asset source such that the global information-source metadata repository contains a more complete view of the entity's information-asset sources;
a provisioning module, stored in memory, that enables the second data-management system to discover the information-asset source by providing, at the global information-source metadata repository, access to the metadata of the information-asset source to the second data-management system;
at least one physical processor configured to execute the receiving module, the determination module, the extraction module, the storing module, and the provisioning module.

16. The system of claim 15, wherein:
the receiving module further receives, at the global information-source metadata repository from the second data-management system, a digital representation of an additional information asset, wherein:
the digital representation of the additional information asset comprises metadata about the additional information asset; and
the metadata of the additional information asset was generated by the second data-management system and not previously seen at the global information-source metadata repository;
the determination module further discovers, at the global information-source metadata repository within the metadata of the additional information asset metadata of an additional information-asset source that contains the additional information asset, the metadata of the additional information-asset source having never been seen previously at the global information-source metadata repository;
the extraction module further extracts, at the global information-source metadata repository, the metadata of the additional information-asset source from the metadata of the additional information asset;
the storing module further transforming, at the global information-source metadata repository, the digital representation of the additional information asset into a digital representation for the additional information-asset source by:
storing, at the global information-source metadata repository, a digital representation of the additional information-asset source; and
storing, at the global information-source metadata repository, the metadata of the additional information-asset source in association with the digital representation of the additional information-asset source such that the global information-source metadata repository contains a more complete view of the information-asset sources of the entity;

the provisioning module further enables the first data-management system to discover the additional information-asset source by providing, from the global information-source metadata repository, access to the metadata of the additional information-asset source to the first data-management system.

17. The system of claim 15, wherein the provisioning module provides access to the metadata of the information-asset source by providing a list of information-asset sources to the second data-management system.

18. The system of claim 15, wherein the first data-management system generates the metadata of the information asset while performing routine operations on the information-asset source.

19. The system of claim 15, wherein:
the metadata of the information asset comprises a fully qualified path of the information asset;
the extraction module extracts the metadata of the information-asset source from the metadata of the information asset by extracting the metadata of the information-asset source from the fully qualified path of the information asset.

20. A non-transitory computer-readable medium comprising one or more computer-readable instructions that, when executed by at least one processor of a computing device, cause the computing device to:
receive, at a global information-source metadata repository, a digital representation of an information asset, wherein:
the digital representation of the information asset comprises metadata of the information asset;
the metadata of the information asset was received from and generated by a first data-management system that is configured to scan an information-asset source containing information assets of an entity;
the information-asset source is unknown to the global information-source metadata repository and a second data-management system that is configured to scan information assets of the entity;
the first data-management system and the second data-management system are different types of data-management systems that manage information assets of the entity in different fields of data management;
the first data-management system, the second data-management system, and the global information-source metadata repository are separate and distinct systems that are configured to operate independently; and
the metadata of the information asset has not been previously seen at the global information-source metadata repository;
transform, at the global information-source metadata repository, the digital representation of the information asset into a digital representation for the information-asset source by:
discovering the information-asset source at the global information-source metadata repository by discovering metadata of the information-asset source within the metadata of the information asset, the metadata of the information-asset source having never been seen previously at the global information-source metadata repository;
extracting, at the global information-source metadata repository, the metadata of the information-asset source from the metadata of the information asset;
storing, at the global information-source metadata repository, a digital representation of the information-asset source; and
storing, at the global information-source metadata repository, the metadata of the information-asset source in association with the digital representation of the information-asset source such that the global information-source metadata repository contains a more complete view of the entity's information-asset sources; and
enable the second data-management system to discover the information-asset source by providing, at the global information-source metadata repository, access to the metadata of the information-asset source to the second data-management system.

* * * * *

UNITED STATES PATENT AND TRADEMARK OFFICE
CERTIFICATE OF CORRECTION

PATENT NO. : 10,073,864 B1
APPLICATION NO. : 14/561244
DATED : September 11, 2018
INVENTOR(S) : Koeten et al.

Page 1 of 1

It is certified that error appears in the above-identified patent and that said Letters Patent is hereby corrected as shown below:

On the Title Page

In Item (73), under "Assignee", in Column 1, Lines 1-2, delete "Mountain City," and insert -- Mountain View, --, therefor.

Signed and Sealed this
Twenty-fifth Day of December, 2018

Andrei Iancu
*Director of the United States Patent and Trademark Office*